Oct. 18, 1927.
P. H. FULLER
1,645,902
LUBRICANT EXPELLING CUP
Filed Nov. 10, 1925
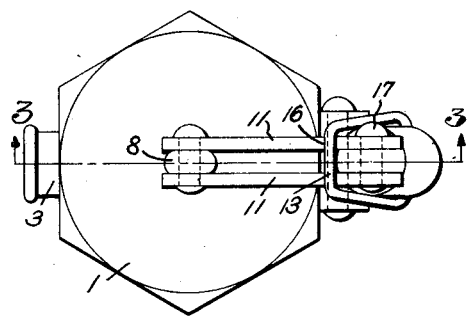
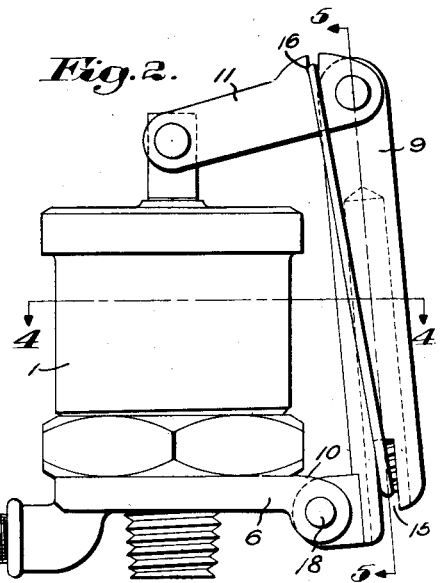
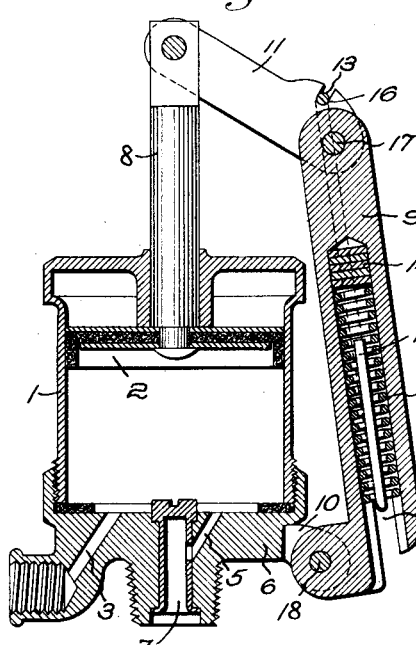
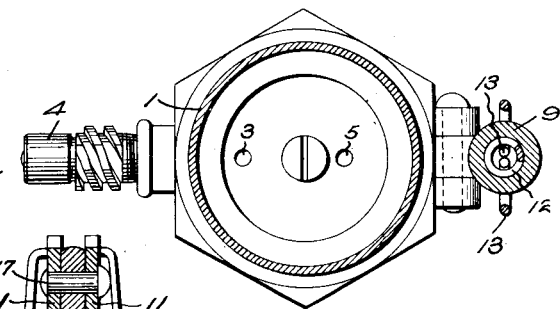
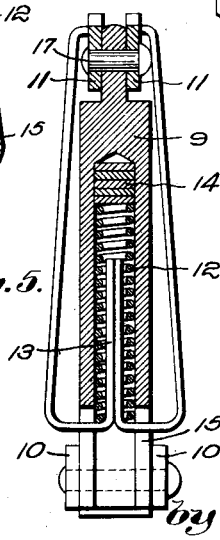
Inventor:
Perley H. Fuller,
by Emery, Booth, Janney & Varney
Attys Patented Oct. 18, 1927.

1,645,902

UNITED STATES PATENT OFFICE.

PERLEY H. FULLER, OF AUBURN, MAINE, ASSIGNOR, BY MESNE ASSIGNMENTS, TO THE BASSICK MANUFACTURING COMPANY, OF CHICAGO, ILLINOIS, A CORPORATION OF DELAWARE.

LUBRICANT-EXPELLING CUP.

Application filed November 10, 1925. Serial No. 68,179.

This invention aims to provide improvements in lubricant-expelling cups.

In the drawings, which illustrate a preferred embodiment of my invention:—

Figure 1 is a plan view of a lubricant cup;

Fig. 2 is a side elevation of the cup;

Fig. 3 is a section on the line 3—3 of Fig. 1, being partly in elevation;

Fig. 4 is a plan section taken on the line 4—4 of Fig. 2; and

Fig. 5 is a section on the line 5—5 of Fig. 2, being partly in elevation.

Referring to the drawings, I have shown a lubricant cup adapted to be secured to a part to be lubricated and provided with means for regulating the pressure and the supply of lubricant to the part to be lubricated. Heretofore lubricant cups have been devised which would feed lubricant to a part to be lubricated, but they would not feed lubricant at a uniform pressure and a uniform rate. The disadvantage of these devices was that the lubricant pressure and rate of feed thereof diminished as the piston emptied the reservoir. Thus the part to be lubricated received a constantly diminishing supply of lubricant.

The cup illustrated in the drawings is provided with means to overcome the trouble heretofore experienced so that the supply of lubricant to the part to be lubricated is always uniform as to a given pressure and rate of flow.

The cup shown is provided with a lubricant reservoir 1, which may be formed in any suitable manner, a piston 2 of usual construction, an inlet passage 3 having a lubricant receiving nipple 4 cooperating therewith, a discharge passage 5 and means for moving the piston 2 in one direction to force lubricant from the reservoir 1. In this instance, I have shown a cup which is provided with a removable lower head 6 in which are located the inlet and discharge passages 3 and 5. A rotary adjustable valve 7 is located in the discharge passage 5 so that the flow of lubricant may be controlled.

The means for operating the piston in one direction includes a piston stem 8 passing out through the upper end of the reservoir 1, a hollow spring-carrying part 9 pivoted upon a pair of ears 10, 10 carried by the removable head 6, a pair of links 11, 11 pivotally connecting the upper ends of the stem 8 and part 9. I also provide a spring 12 located in the hollow part 9 and a yoke-shaped part or wire 13 supporting one end of the spring 12 and engaging the links 11, 11 as best illustrated in Figs. 3 and 5. Relatively thin disks 14 are inserted in the hollow part 9 to permit adjustment of the tension of the spring 12 for purposes more fully hereinafter described.

The spring 12 and disks 14 are held in place by the yoke 13, the ends of which extend a substantial distance between the coils of the spring as shown in Figs. 3 and 5. Slots 15 are provided at opposite sides of the part 9 at its lower end to permit upward and downward movement of the yoke 13 as the spring expands and contracts.

Assuming the reservoir to be empty, it may be filled in any suitable manner, but I prefer to fill it by connecting a lubricant supply under pressure (not shown) to the nipple 4 so that the lubricant may pass through the inlet passage 3 into the reservoir and force the piston 2 to the top of the reservoir 1, as shown in Fig. 3. The filling operation may be continued after the piston has assumed the position shown in Fig. 3, so that the bearing or part to be lubricated (not shown) may be freed from hardened lubricant or dirt by the lubricant which may be fed to the reservoir under very high pressure. When the reservoir is filled with lubricant, the piston operating parts will assume the positions shown in Fig. 3, so that, when the supply of lubricant is disconnected from the nipple 4, the parts will automatically begin to operate and move the piston 2 downwardly in the reservoir 1. The cooperation between these parts is such that a predetermined uniform pressure is exerted upon the lubricant throughout the entire discharge stroke of the piston. This uniformity of pressure is obtained by arranging the parts so that the differences in leverage between the parts 8, 9, 11 and 13 compensates for the gradual weakening of the spring as the piston 2 moves downwardly. Figs. 3 and 2 illustrate how this works out to give a uniform pressure. For example, when the spring 12 is compressed and therefore exerts the greatest pressure on the yoke 13 (Fig. 3), the leverage is the least. This is true because the point 16 at which the yoke 13 engages the links 11, 11 is nearer to an imaginary line (or the line of strain) between that point where the spring 12 bears against the yoke 13 and the pivot point 17 between the links 11, 11 and the part 9, than when the piston is at the bottom of the reservoir 1 (Fig. 2). Fig. 2 shows the relation of parts when the leverage is greatest while the tension of the spring is least. Between these extremes the increase in leverage compensates for the decrease in spring tension.

In some cases, it may be necessary to vary the given pressure exerted upon the piston 2 and this may be easily effected by adding or subtracting one or more of the disks 14 to increase or diminish the pressure as required.

The flow of lubricant may be varied by simply removing the head 6 and turning the valve 7 to vary the size of the opening between the passage 5 and the passage in the valve which leads to the part to be lubricated.

The part 9 is pivoted at 18 to the ears 10, 10 to permit it to swing toward and away from the stem 8 during upward and downward movement of the stem, thereby providing a toggle arrangement to provide for the leverage which is necessary to cooperate with the spring 12 and exert a uniform pressure on the piston stem 8.

While I have shown and described a preferred embodiment of my invention, it will be understood that changes involving omission, substitution, alteration and reversal of parts and even changes in the mode of operation may be made without departing from the scope of my invention, which is best defined in the following claims.

Claims:

1. A lubricant cup comprising a supply reservoir, a piston in said reservoir for forcing lubricant therefrom, a discharge passage for connecting said reservoir with a part to be lubricated, a compression spring for actuating said piston, and means interposed between said spring and said piston to cause said spring to exert uniform force on said piston throughout its stroke.

2. Lubricating mechanism comprising a lubricant receptacle, means for attaching said receptacle to a part to be lubricated, a piston in said receptacle for forcing lubricant therefrom, a discharge passage for said lubricant, a compression spring for actuating said piston, means interposed between said spring and said piston for receiving the non-uniform pressure of said spring and applying uniform pressure to said piston, and means to vary the pressure on said piston.

3. A lubricant cup comprising a supply reservoir, a piston in said reservoir for forcing lubricant therefrom, a discharge passage for connecting said reservoir with a part to be lubricated, a valve in said passage, and pivoted means for exerting a uniform pressure on said piston, said means deriving its power from a compression spring.

4. Lubricating mechanism comprising a lubricant receptacle, an inlet passage therefor, a coupling member secured to said inlet, a piston for forcing lubricant from said receptacle, a discharge passage for connecting said receptacle with a part to be lubricated, and variable means for exerting a predetermined uniform pressure on said piston, said means being actuated by a member exerting a thrust in opposite directions.

5. A lubricant cup comprising, in combination, a supply reservoir, a piston in said reservoir for forcing lubricant therefrom, inlet means through which said reservoir may be filled with lubricant, the lubricant also forcing the piston to the top of the reservoir, a discharge passage connecting said reservoir with a part to be lubricated, spring-operated leverage means supported by said cup and acting upon said piston to maintain a uniform pressure on the lubricant in said reservoir throughout the entire stroke of the piston and a rotary valve in said outlet passage for controlling the flow of lubricant from said reservoir to the part to be lubricated.

6. A lubricant cup comprising, in combination, a supply reservoir, a piston in said reservoir for forcing lubricant therefrom, a discharge passage for connecting said reservoir with a part to be lubricated, and automatically acting mechanical means for actuating said piston in one direction, said means including a spring, a stem secured to said piston and slidably arranged in said cup, a spring-carrying part pivotally secured to said cup, a link connecting said spring-carrying part and said stem and a spring-actuated member engaging said link.

7. A lubricant cup comprising, in combination, a supply reservoir, a piston in said reservoir for forcing lubricant therefrom, a piston stem secured to said piston, a spring-carrying member pivotally secured to the cup, a link arrangement connecting the free ends of the piston stem and spring-carrying member, a spring carried by said spring-carrying member and another member connecting said spring and said link arrangement so that, as the piston is moved in said reservoir, the leverage between the spring-carrying member and the other member will increase thereby exerting a uniform pressure upon the piston as the spring becomes expanded.

8. A lubricant cup comprising, in combination, a supply reservoir, a piston in said reservoir for forcing lubricant therefrom, a piston stem secured to said piston, a spring-carrying member pivotally secured to the cup, a link arrangement connecting the free ends of the piston stem and spring-carrying member, a spring carried by said spring-carrying member and another member connecting said spring and said link arrangement so that, as the piston is moved in said reservoir, the leverage between the spring-carrying member and the other member will increase thereby exerting a uniform pressure upon the piston as the spring becomes expanded, and means for varying the tension exerted by said spring.

9. A lubricant cup comprising, in combination, a supply reservoir, a piston in said reservoir for forcing lubricant therefrom, a piston stem secured to said piston, a spring-carrying member pivotally secured to the cup, a link arrangement connecting the free ends of the piston stem and spring-carrying member, a spring carried by said spring-carrying member and another member connecting said spring and said link arrangement so that, as the piston is moved in said reservoir, the leverage between the spring-carrying member and the other member will increase thereby exerting a uniform pressure upon the piston as the spring becomes expanded, and a plurality of relatively thin parts carried by said spring-carrying part and interposed between said part and one end of said spring for varying the tension of said spring.

In testimony whereof, I have signed my name to this specification.

PERLEY H. FULLER.